United States Patent
Preimesberger

(10) Patent No.: US 8,281,025 B2
(45) Date of Patent: Oct. 2, 2012

(54) CONTEMPORANEOUS PEER-TO-PEER MULTICAST DATA DISTRIBUTION

(75) Inventor: Lee Preimesberger, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 882 days.

(21) Appl. No.: 11/151,079

(22) Filed: Jun. 13, 2005

(65) Prior Publication Data

US 2006/0282510 A1    Dec. 14, 2006

(51) Int. Cl.
*G06F 15/16* (2006.01)
(52) U.S. Cl. ........ 709/231; 709/201; 709/203; 709/217; 709/219; 709/224; 709/232
(58) Field of Classification Search .......... 709/201–203, 709/217–219, 223–224, 231–233; 370/390, 370/432
See application file for complete search history.

(56) References Cited

U.S. PATENT DOCUMENTS

| | | | | |
|---|---|---|---|---|
| 5,541,927 A * | 7/1996 | Kristol et al. | ................. | 370/408 |
| 5,774,660 A * | 6/1998 | Brendel et al. | ................ | 709/203 |
| 5,862,329 A * | 1/1999 | Aras et al. | ...................... | 709/204 |
| 6,049,823 A * | 4/2000 | Hwang | ......................... | 709/219 |
| 6,256,673 B1 * | 7/2001 | Gayman | ....................... | 709/231 |
| 6,532,495 B1 * | 3/2003 | Welles et al. | ................. | 709/232 |
| 6,618,752 B1 * | 9/2003 | Moore et al. | ................. | 709/217 |
| 7,159,036 B2 * | 1/2007 | Hinchliffe et al. | ............ | 709/223 |
| 7,324,542 B2 * | 1/2008 | Furlong et al. | ................ | 370/432 |
| 7,328,256 B2 * | 2/2008 | Taoyama et al. | ............. | 709/219 |
| 7,353,267 B1 * | 4/2008 | Cunningham et al. | ........ | 709/231 |
| 7,362,758 B2 * | 4/2008 | Chang et al. | .................. | 370/390 |

* cited by examiner

*Primary Examiner* — Bharat N Barot

(57) ABSTRACT

A method of distributing a disk image by multicast includes a first computer downloading a disk image over a network, at least one second computer detecting the download and requesting the disk image, and the first computer multicasting the disk image to the at least one second computer.

19 Claims, 5 Drawing Sheets

CONTEMPORANEOUS PEER-TO-PEER MULTICAST DATA DISTRIBUTION

BACKGROUND

As computer systems are assembled, an operating system and applications are typically installed on the disk drive in each computer system. The process is often repeated, particularly by large organizations deploying multiple computer systems, to install additional applications or to customize the software installed on the computer systems. Disk duplication systems may be used to rapidly configure one or more disk drives by duplicating the configuration from one source disk drive to one or more target disk drives. An image of a model disk or source disk drive is created, representing the desired state of the duplicated disk drives with the software installed. The disk image is then copied to additional disk drives, either before or after the disk drives are installed in computer systems.

Disk images may be distributed over networks for installation on disk drives. One solution to network distribution of disk images is to use a multicast, enabling the distribution of a disk image to multiple target disk drives on a network simultaneously, rather than transferring the disk image to one disk drive at a time over the network. For example, the Norton Ghost® backup software available from the Symantec Corporation of Cupertino, Calif. and the Clonezilla open source disk cloning software both enable the creation of a disk image and its transmission by multicast to multiple target computer systems over a network. While network distribution of disk images increases the number of disk drives that can be configured simultaneously, it does add some complexity in setting up the network, connecting the target disk drives and initiating the transfer of a disk image to the disk drives. A typical multicast transmission may involve configuring the multicast server with the disk image to distribute and with the internet protocol (IP) address for the multicast group. A typical multicast transmission may also involve configuring the client computers or targets with the IP address so that they join the multicast group and collect the multicast data packets rather than filtering them out and ignoring them when the multicast transmission is initiated on the multicast server.

SUMMARY

An exemplary method of distributing a disk image by multicast includes a first computer downloading a disk image over a network, at least one second computer detecting the download and requesting the disk image, and the first computer multicasting the disk image to the at least one second computer.

BRIEF DESCRIPTION OF THE DRAWINGS

Illustrative embodiments are shown in the accompanying drawings as described below.

DESCRIPTION

The drawings and description, in general, disclose a method and apparatus for distributing data over a network using multicast. The multicast may be automatically organized by computers or other network devices without the need for user intervention, based on a previous download. The same data may be distributed simultaneously to multiple destinations, reducing the bandwidth required and avoiding bottlenecks.

The term "multicast" is used herein to refer to any method of transmitting information over a network to multiple destinations simultaneously, without simply broadcasting the information to all destinations on the network. For example, this may comprise transmitting information in packets using multicast as defined by the Internet Protocol, using any type or scope of multicast addresses. The term "broadcast", in contrast, is used herein to refer to any method of transmitting information over a network to all destinations on the network simultaneously, such as by using the network broadcast address or by multicasting to all possible destinations on the network.

In one exemplary embodiment, the method and apparatus for distributing data over a network using multicast is used in a disk duplication system in which one or more hard disk images are generated or stored on a server and are distributed to multiple client computers. Once received by the client computers, the disk images may be used to overwrite or initialize one or more hard drives in the client computers, thereby creating preconfigured partitions, installed operating systems and applications, etc. Disk images may be downloaded by client computers directly from the server. However, if all images are downloaded directly from the server, bandwidth problems may arise due to congestion at the server hard drives and the networking infrastructure connecting the server to the client computers. Small numbers of client computers may be able to download images extremely quickly, but additional client computers eventually slow the download process down to such an extent that download time will overrun the time allotted.

Figure 1:
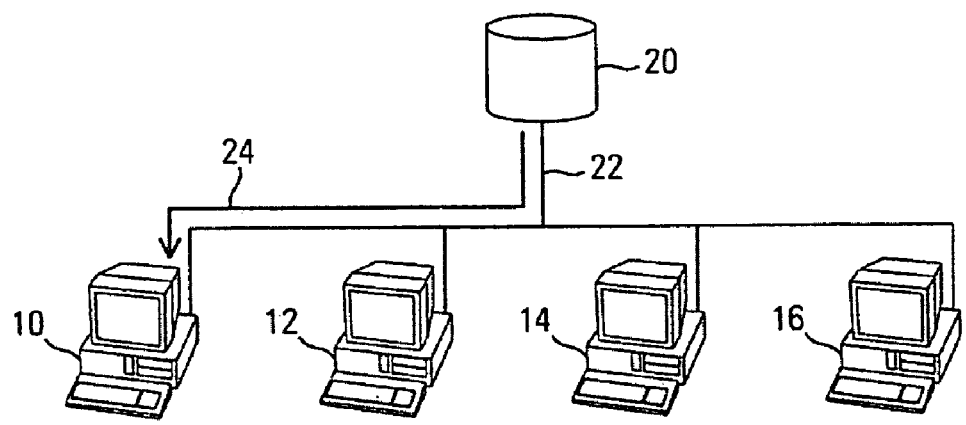
FIG. 1 is an exemplary block diagram illustrating a network data source and a group of computer systems, with one of the computer systems downloading data from the network data source.
Figure 2:
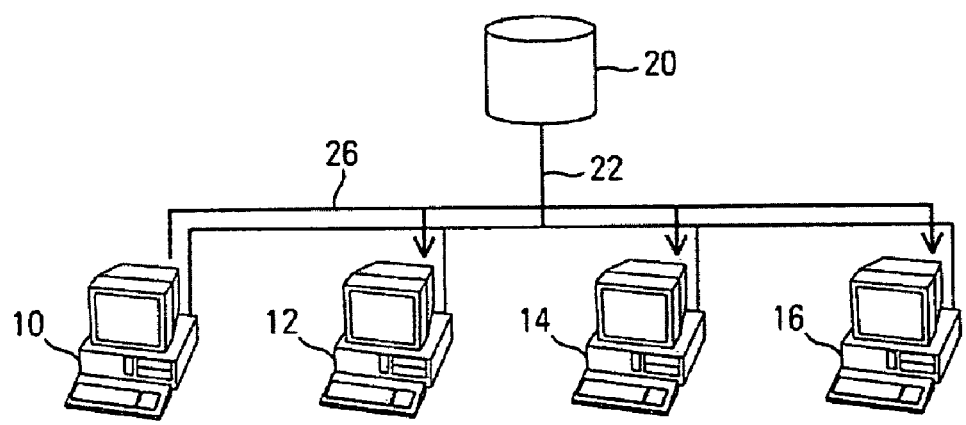
FIG. 2 is an exemplary block diagram illustrating the network data source and the group of computer systems of FIG. 1, with the other computer systems receiving the data in a multicast from the first computer system.

The method and apparatus for distributing data over a network using multicast offloads some of the input/output (I/O) intensive work from the server by sharing successfully downloaded disk images from one client computer to others using multicast. This allows the server the freedom to distribute additional images and to create new, unique images while client computers, which might otherwise be sitting idle, do the work of distributing previously downloaded disk images. FIGS. 1 and 2 provide an illustration of this process. A number of client computers 10, 12, 14 and 16 are connected to a server 20 by a network 22. A disk image (not shown) is stored on the server 20. One of the client computers 10 downloads 24 the disk image directly from the server 20, acting as a master in the multicast distribution process (after first determining whether another client computer is already downloading the disk image, as will be described in more detail below). While the disk image is being downloaded 24 by the master 10, other client computers 12, 14 and 16 are made aware of the disk image in any suitable manner. For example, the master 10 may broadcast one or more indications or advertisements that the particular disk image is being downloaded, informing all client computers on the network (such as those on the same subnet of a local area network) of the download. In one alternative embodiment, the other client computers 12, 14 and 16 may detect the download themselves by monitoring data packets on the network 22. In another alternative embodiment, the server 20 may broadcast advertisements that the master 10 is downloading the particular disk image. In yet another alternative embodiment, the server 20 may respond to download requests for the particular disk image from the other client computers 12, 14 and 16 with an indication that it is currently being downloaded by the master 10 or with instructions to interrogate other client computers to see whether the disk image is being downloaded. The other client computers 12, 14 and 16 needing the disk image, referred to herein as clones, notify the master 10 that they would like a copy of the disk image. In one exemplary embodiment, the clones 12, 14 and 16 transmit one or more requests to the master 10 for the disk image. Alternatively, the server 20 may track requests for the disk image by the clones and alert the master 10 to the need.

After the master 10 has successfully downloaded the disk image, the master 10 multicasts 22 the disk image to the clones 12, 14 and 16. A disk image is thus distributed to multiple client computers 10, 12, 14 and 16 with only a single download 24 from the server 20. Much of the work of distributing the disk image is offloaded from the server 20 to the master 10. The method and apparatus for distributing data over a network using multicast also organizes the multicast automatically, without the need to manually schedule the multicast on the server 20 and client computers 10, 12, 14 and 16. The initial download 24 by the master 10 triggers the identification of other client computers 12, 14 and 16 needing the disk image so that their identities need not be collected in advance. The method and apparatus for distributing data over a network using multicast also shifts the burden of conducting the multicast from the server 20 to a master 10 that might otherwise be sitting idle, freeing the server 20 for other tasks.

Figure 3:
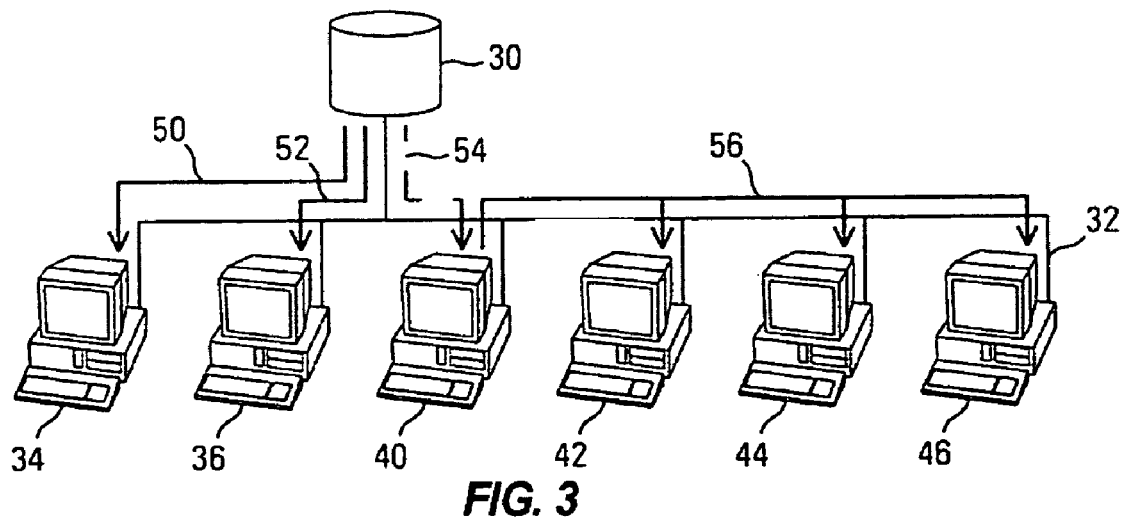
FIG. 3 is an exemplary block diagram illustrating a network data source and a group of computer systems, with two computer systems downloading different data from the network data source while a third computer system multicasts previously downloaded data to two other computer systems.

An exemplary block diagram of a disk image distribution system is illustrated in FIG. 3, wherein a disk image server 30 is connected by a network 32 to client computers 34, 36, 40, 42, 44 and 46. Client computers 34 and 36 are each directly downloading 50 and 52 disk images from the server 30. Client computer 40, acting as a master, has previously downloaded 54 a disk image, and is currently multicasting 56 that disk image to client computers 42, 44 and 46 which are acting as clones. Note that the three disk images downloaded 50, 52 and 54 from the server 30 need not be the same. By shifting the distribution 56 of the disk image to clones 42, 44 and 46 from the server 30 to the master 40, the server 30 is freed to dedicate more resources to the distribution 50 and 52 of other disk images or other tasks such as generating custom disk images.

The method and apparatus for distributing data over a network using multicast is not limited to the exemplary disk image distribution system discussed above, but may be used to distribute any type of data in any type of network environment to any type of device. For example, data may be distributed to specialized network devices rather than to multipurpose computer systems. The network may comprise any type of connection between devices or computers, such as a local area network (LAN), a wide area network (WAN), the Internet, etc. The system may include a dedicated file server or may consist of a group of connected computers, wherein one or more of the computers has data to be shared. In this exemplary system, another computer in the group may become aware of the data in any suitable manner, and may begin downloading the data and advertising the download as an available multicast as described above. In the exemplary disk image distribution embodiment, disk images may be used for initial configuration of hard drives, either before or after installation in computer systems, or may be used to reconfigure a hard drive that has previously been used.

A client computer may be caused to download a particular disk image in any suitable manner. For example, in the exemplary disk image distribution system described above, a client computer may be provided with the identification of a needed disk image to request from the server. Alternatively, the client computer may be able to browse the server for a disk image that matches its hardware, such as disk size, etc. A client computer may be initialized for network connection and disk image download and installation in any suitable manner. The client computer may be booted using software on a CD-ROM or floppy disk that causes it to connect to the server over the network and to download a particular disk image, or the client computer may be booted over the network using any suitable network boot method now known or that may be developed in the future.

Figure 4:
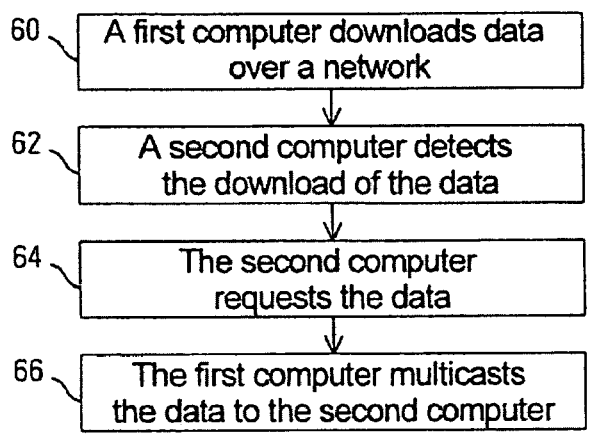
FIG. 4 is a flow chart illustrating an exemplary operation for distributing electronic data.

An exemplary embodiment of the method and apparatus for distributing data over a network using multicast is illustrated in the flow chart of FIG. 4. A first computer downloads 60 data over a network. A second computer detects 62 the download of the data and requests 64 the data. After the first computer successfully completes the download of the data, the first computer multicasts 66 the data to the second computer.

The execution flow in one exemplary embodiment of the method and apparatus for distributing data over a network using multicast is set forth below. Note that the "unit" may correspond to a computer or other device on the network needing data referred to as an image. The unit begins by determining whether the desired image is already being downloaded, and may act as either a master or a clone as a result.

1) Incoming data packet from server instructs unit to find another unit downloading image 'X'
2) Unit broadcasts datagrams requesting image 'X'
3) Repeat broadcasts every 2 seconds until either 16 seconds have elapsed or a master unit responds with an acknowledgment.
4) If an acknowledgment was received, go to item 11.
5) Start master thread to respond to requests from other units. If a request for a particular disk image is received from a clone, allocate a multicast address to be used in a multicast transmission of the image after download and transmit the multicast address in a response to the clone. Thereafter, respond to any requests for the image (including regular "heartbeat" request datagrams from clones) with a response including the multicast address.
6) Begin normal download of image. Regularly broadcast master "heartbeat" datagrams advertising the image download. Receive and respond to regular "heartbeat" request datagrams from any clones requesting the image.
7) When image is complete, kill master thread to prevent additional units from connecting to the multicast while in progress.
8) Transmit image by multicast using the allocated multicast address to all clones in the multicast group that were actively broadcasting "heartbeat" request datagrams. Continue to receive "heartbeat" datagrams from the receivers to detect if multicast needs to be throttled back or if all clones disappear.
9) Close connection to multicast group and close socket.
10) Use image as desired, end process.
11) Repeatedly broadcast "heartbeat" datagrams requesting the image, while waiting until either the master sends notification of an incoming multicast, or the master no long responds to the "heartbeat" request datagrams. If the master stops responding to the "heartbeat" request datagrams, return to item 2.
12) Receive image from multicast, continuing to broadcast "heartbeat" datagrams to master indicating that multicast packets have been received and that clone is alive.
13) If multicast is interrupted or becomes garbled for any reason, return to item 2.
14) Close connection to multicast group and close socket.
15) Use image as desired, end process.

The process of seeking a particular disk image or other data on the network may be initiated in any suitable manner. In the exemplary disk duplication system described herein, a coordinating server is connected to the network for directing units to seek a particular disk image. In this exemplary embodiment, the unit boots to the network and connects to the coordinating server. An operator scans in purchase order information for the unit, and SKU part numbers are identified based on the purchase order information. The SKU part numbers and information about the hard drive are combined to form a cookie for that image on the server. The cookie is sent to the unit, and the unit seeks the disk image identified by the cookie. However, the method and apparatus for distributing data over a network using multicast is not limited to this method of identifying a disk image to be sought and downloaded. For example, if only one particular disk image were available for each type of hard drive, the unit could generate the identification for the disk image based solely on the hard drive installed in the unit. In alternative embodiments, the unit may seek other types of information on the network and may identify the information in any suitable manner.

The datagrams that are broadcast by the master and clones are transmitted on the local network broadcast address and are delivered to every system on the network, both computers and servers. The clones use the datagrams, and uninterested systems discard the packets automatically. The master regularly broadcasts datagrams while it is downloading the image to advertise the fact that the image is being created somewhere on the network. The clones are paused by these datagrams while the image creation is underway, waiting for either the master to start multicasting or to disappear off the network. The master may disappear, for example, if someone unplugs the system before the multicast is complete, or if there is a network problem. If the master completes the multicast, the clients will use that data. If the master disappears without a multicast, then whichever clone abandons the wait first will become the new master and the other clones will wait on it as it downloads the image.

The master and the clones are kept aware of each other by the broadcast datagrams to prevent the system from aborting whenever errors occur. The master broadcasts that it is still alive so the clones keep waiting intelligently and can become the new master if anything happens to the original master. Similarly, the clones broadcast to make the master is aware of them both during the download and the multicast so that it knows whether a multicast is needed and so that it can throttle the multicast speed to make it usable or terminate the multicast if all clones die or the network goes down.

Figure 5:
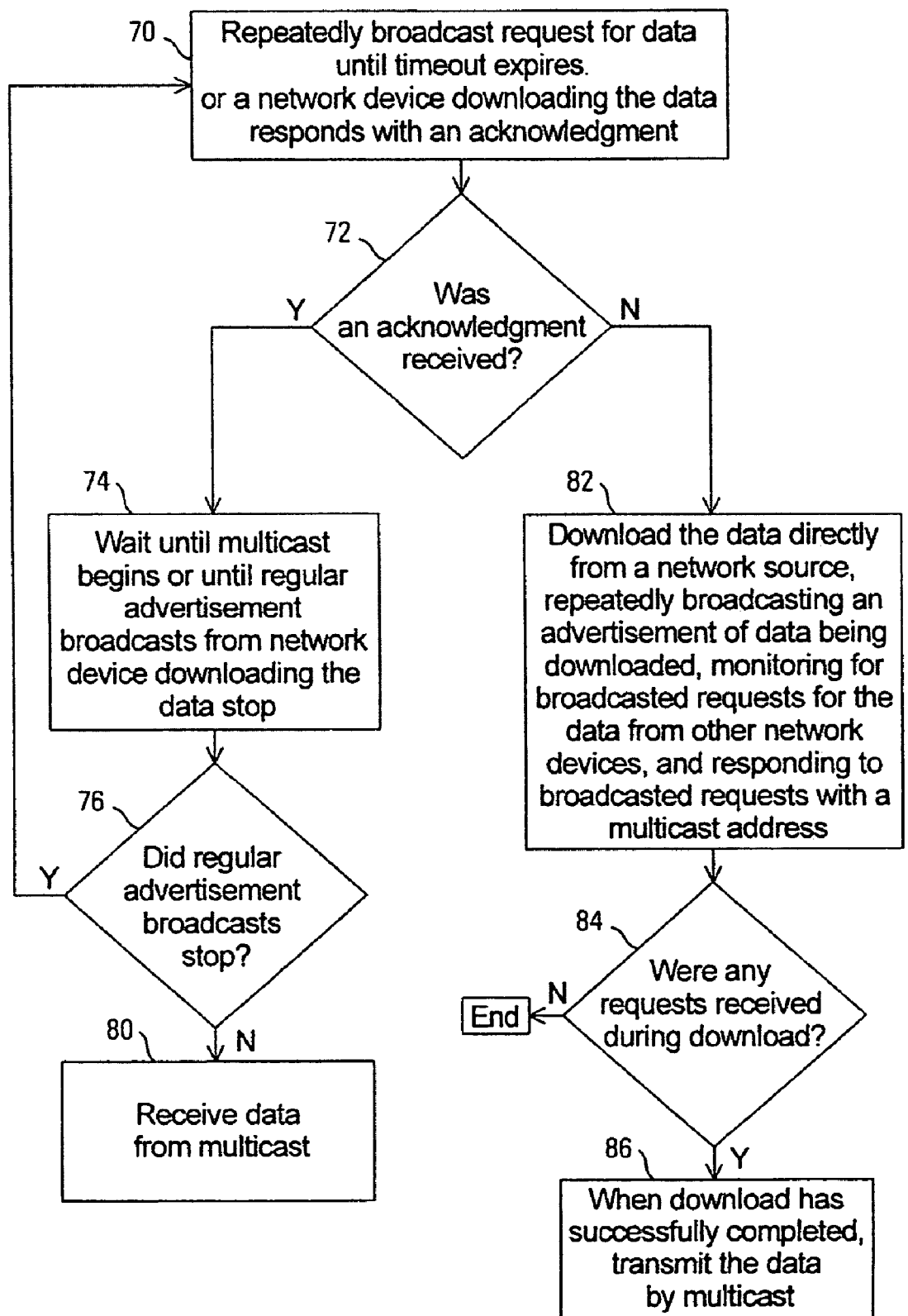
FIG. 5 is a flow chart illustrating another exemplary operation for distributing electronic data.

The execution flow in the exemplary embodiment of the method and apparatus for distributing data over a network using multicast is further illustrated in the flow chart of FIG. 5. The unit repeatedly broadcasts 70 a request for data such as the disk image until a timeout expires or a master responds with an acknowledgment. If 72 an acknowledgment was received, the unit operates as a clone and waits 74 until the multicast begins or until regular advertisement heartbeats from the master stop. If 76 the advertisement heartbeats from the master stop, the process restarts with the unit broadcasting 70 a request for the data to determine if another unit has begun downloading the data as a master. Otherwise, the clone receives 80 the data from the multicast as it is transmitted by the master.

If 72 no acknowledgment from a master was received as the unit broadcasted the request for the data, the unit operates as the master and downloads 82 the data directly from a network source. During the download, the master repeatedly broadcasts 82 an advertisement that the data is being downloaded, monitors the network for requests for the data from other units, and responds to those requests with a multicast address to be used after the download is complete. Note that one multicast address is allocated for each unique disk image being distributed in the system. If 84 any requests were received during the download, the master transmits 86 the data by multicast after it has been successfully downloaded.

A disk image or other data being distributed by multicast may be identified in any suitable manner. For example, the disk image may be identified by a hash of the image or of a list of software components in the image using an algorithm such as the Message-Digest algorithm 5 (MD5) cryptographic hash function. The disk image may also be identified by size, or by the drive parameters of the target hard disk, such as number of cylinders, heads, sectors, and maximum Logical Block Addressing (LBA), or any combination of these or other potential identifiers such as a unique identification label assigned to the disk image.

Exemplary advertisement and request datagram structures and multicast data packet formats are listed below. Using the same advertisement/request packet structure simplifies using the same code for master or clone operation in one machine as described above.

```
Multicast Data Packet / ACK / NAK Format
// State-indicating size numbers - tcp doesn't allow
// packets this large so these values should never be used
// COMPLETE means image is complete
#define   COMPLETE   0xFFFFFFFF
// DOOMED means fatal failure
#define   DOOMED     0xFFFFFFFE
// Packet type-indicating LBA numbers
//LBA for NAK packet
#define   NAK           0xFFFFFFFD
// LBA for ACK packet
#define   ACK           0xFFFFFFFC
typedef struct {
    unsigned long Sequence;   // 0–3
    unsigned char Device;     // 4
    unsigned long LBA;        // 5–8, reused for ACK/NAK
    unsigned short Size;      // 9–10, size in bytes
    unsigned char Data[ MAX_NIBBLE ];
}
```

```
Advertisement/Request Packet Structure
#define NEED 0
#define HAVE 1
typedef struct {
```

```
        unsigned char MD5[ MD5_SIZE ];
        unsigned long Size;
        unsigned short Cylinders;
        unsigned short Heads;
        unsigned short Sectors;
        unsigned long MaxLBA;
        unsigned char Version;
        unsigned char State;
}
```

The exemplary master transmits packets using the multicast data packet format set forth above. The Sequence field is incremented by one for each packet that is transmitted. The Device field identifies the hard drive on the unit to which the disk image is to be applied. For example, a device ID of zero may indicate the first, or master, hard drive on the unit. The LBA field identifies the sector number to which the disk image is to be applied. If the packet is being sent to acknowledge that a data packet was received correctly, the LBA field is filled with the ACK constant. If the packet is being sent to indicate that a data packet was not received correctly and to request that the packet be retransmitted, the LBA field is filled with the NAK constant. The Size field indicates the amount of data in bytes. When the disk image has been completely received, a COMPLETE packet is sent in which the Size field is filled with the COMPLETE constant. If the transmission of the disk image fails and the unit gives up, a DOOMED packet is sent in which the Size field is filled with the DOOMED constant. The data is stored in the Data array of the multicast data packet.

The exemplary master and clones broadcast datagrams using the advertisement/request packet structure set forth above. When a unit is seeking a disk image, it repeatedly broadcasts a request datagram in which the disk image being downloaded is identified by the MD5, Size, Cylinders, Heads, Sectors, MaxLBA and Version fields. The State field is set to NEED or 0, indicating that the unit is seeking the disk image. Note that using these exemplary disk image identification fields, the unit can generate the disk image identification information based on hardware in the unit, rather than requiring predetermined identification information. While the master is downloading a disk image, it repeatedly broadcasts an advertisement datagram with the identification fields populated as described above. The Version field may be used to identify the version of the multicast distribution software, or the version of the disk image, etc. The State field is set to HAVE or 1, indicating that the master is downloading the disk image.

Figure 6A:
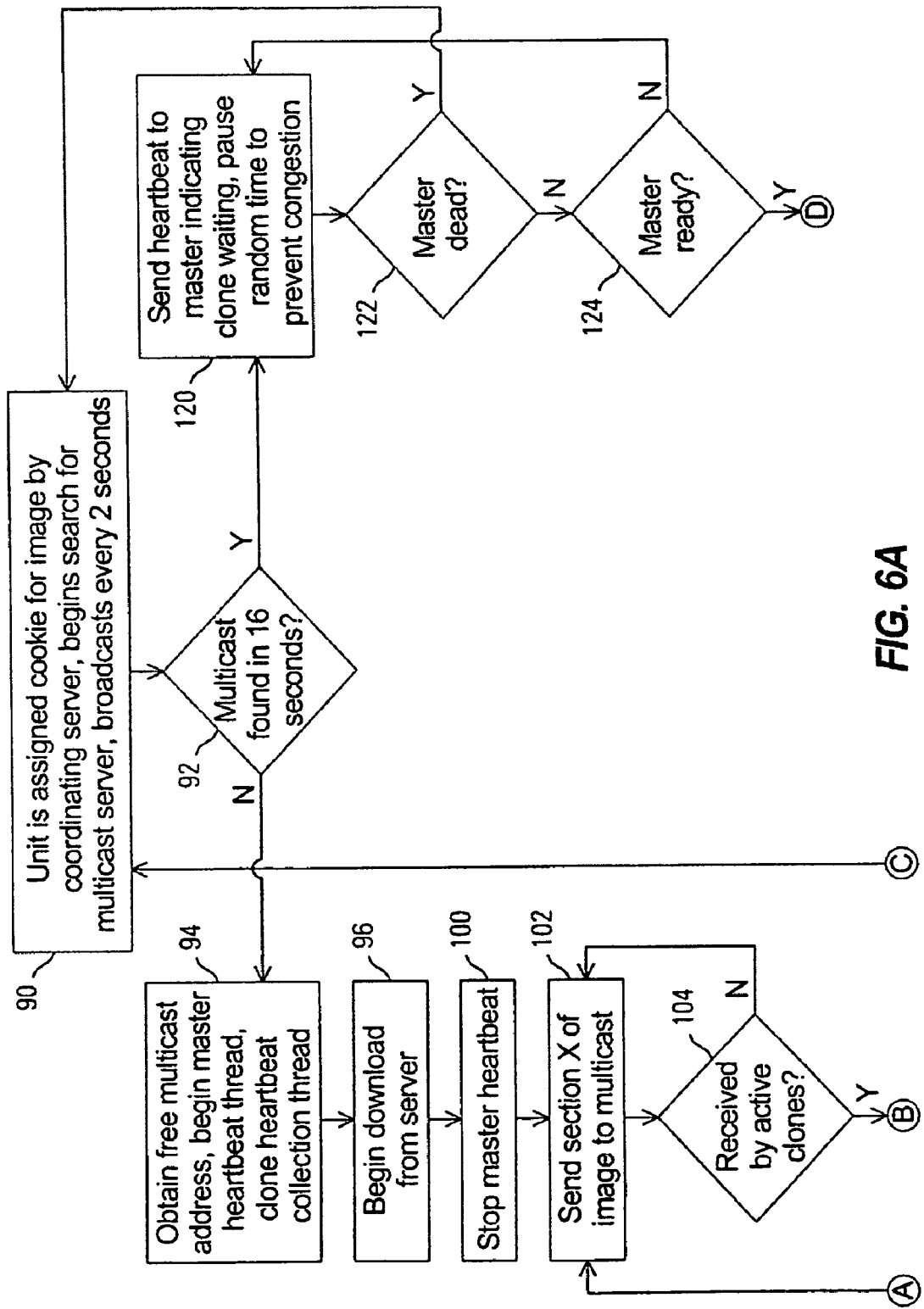
FIGS. 6A and 6B are an exemplary flow chart illustrating another exemplary operation for distributing electronic data.
Figure 6B:
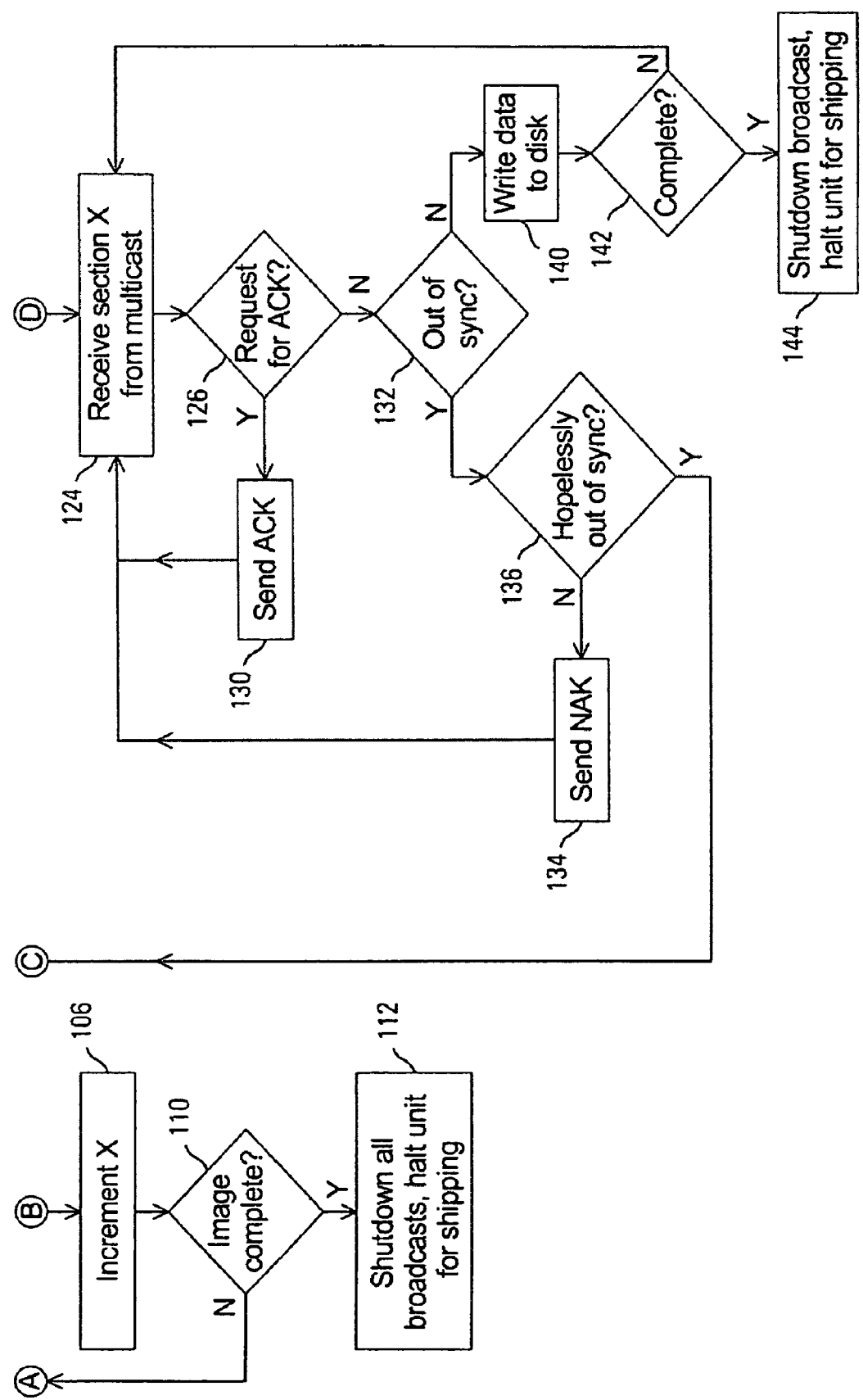

The execution flow in an exemplary embodiment of the method and apparatus for distributing data over a network using multicast, including additional details about packet transmission, is further illustrated in the flow chart of FIGS. 6A and 6B. The unit is assigned 90 a cookie identifying a disk image and begins searching the network for a multicast server by broadcasting requests every two seconds. If 92 a multicast is not found within a predetermined timeout period, such as 16 seconds, the unit operates as a master. This includes obtaining 94 a free multicast address, beginning a master heartbeat thread to broadcast advertisement heartbeat packets, and beginning a clone heartbeat collection thread to collect request heartbeat packets from clones. As discussed above, the free multicast address may alternatively be obtained when a request is received from a clone for the disk image. The master downloads 96 the disk image from the server while broadcasting the master advertisement packets and collecting the clone request packets. After the download is complete, the master begins the multicast, sending the disk image in packets to clones that requested the disk image. After multicasting 102 a section of the disk image in one or more packets, the master determines 104 whether all of the clones correctly received the section, and if not, retransmits 102 the section. The master then increments 106 the section number and, if 110 the disk image has not been fully transmitted in the multicast, transmits 102 the next section. After the disk image has been fully transmitted in the multicast, the master shuts down 112 all broadcasts, applies the disk image to the hard drive if necessary and halts for shipping.

If 92 a multicast was found by the unit within 16 seconds of the time the unit began searching for the disk image, the unit operates as a clone to receive the disk image from a master in a multicast. The clone broadcasts 120 a heartbeat to the master requesting the disk image and indicating that the clone is waiting. The clone may pause 120 a random length of time between request heartbeats to prevent congestion caused by multiple clones transmitting heartbeats simultaneously. If 122 the master does not reply, the unit begins searching 90 again for the disk image on the network. If 122 the master does reply, the clone waits until the master completes the download by transmitting 120 request heartbeats until the multicast begins. The clone then receives 124 a section of the disk image in one or more multicast packets. If 126 the master requests an acknowledgment, the clone transmits 130 an ACK packet. If 132 the clone gets out of sync during the multicast, the clone tries to recover by transmitting 134 a NAK packet so that the master will retransmit the section. If 136 the clone gets hopelessly out of sync, it starts over by searching 90 again for the disk image on the network. If 132 the clone correctly received the section, it writes the data to disk or uses in the data in any other suitable manner, then waits to receive 124 the next section if 142 the disk image is not complete. After 142 the disk image has been completely received, the clone shuts down 14 the heartbeat broadcasts and applies the disk image to the hard drive if necessary and halts for shipping.

In the exemplary embodiments of the method and apparatus for distributing data over a network using multicast described above, the master acts as a new source for data immediately after a download completes, multicasting the data to clones. Units requesting the data during the multicast or later act as masters, downloading the data again from the server or other original source on the network. Alternatively, the master that first downloads the data may make the data available longer, either indefinitely until the master is removed from the network, or for some longer predetermined period of time. In this alternative embodiment, the master would continue to broadcast datagrams indicating that it has a copy of the data, and would arrange one or more multicasts as the data is requested by clones.

Figure 7:
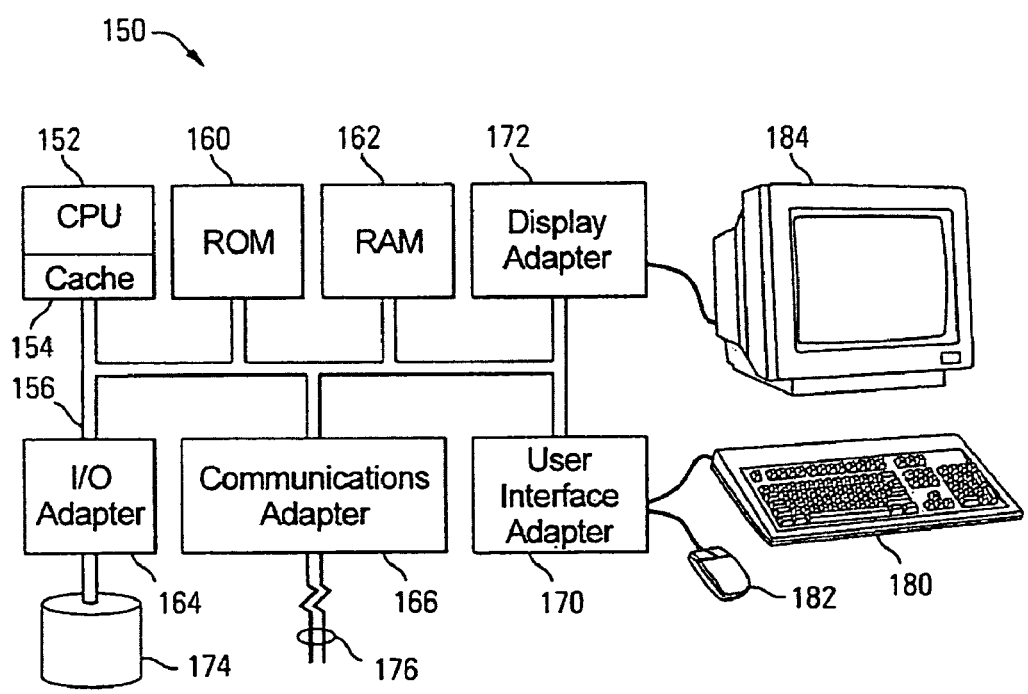
FIG. 7 is a block diagram of an exemplary computer that may be used to receive and/or distribute electronic data over a network.

A typical computer system in which the method and apparatus for distributing data by multicast may be applied is illustrated in the block diagram of FIG. 7. A computer system 150 generally includes a central processing unit (CPU) 152 with a cache 154, connected by a system bus 156 to devices such as a read-only memory (ROM) 160, a random access memory (RAM) 162, an input/output (I/O) adapter 164, a communications adapter 166, a user interface adapter 170, and a display adapter 172. Data storage devices such as a hard drive 174 are connected to the computer system 150 through the I/O adapter 164. In operation, the CPU 152 in the computer system 150 executes instructions stored in binary format on the ROM 160, on the hard drive 174, in the RAM 162, and in the cache 154, causing it to manipulate data stored in the RAM 162 and the cache 154 to perform useful functions.

The computer system 150 communicates with other devices through local or wide area networks (e.g., 176) connected to the communications adapter 166. User input may be obtained through input devices such as a keyboard 180 and a pointing device 182 which are connected to the computer system 150 through the user interface adapter 170. Output may be displayed on a display device such as a monitor 184 connected to the display adapter 172. The hard drive 174 may be initialized with a disk image distributed as described above, or an operating system and application stored on the hard drive 174 may be executed by the CPU 152.

Various computer readable or executable code or electronically executable instructions have been referred to herein. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with any instruction-executing device, such as a general purpose processor, software emulator, application-specific circuit, a circuit made of logic gates, etc. that can access or embody, and execute, the code or instructions.

Methods described and claimed herein may be performed by the execution of computer readable or executable code or electronically executable instructions, tangibly embodied on any computer-readable storage medium or in any electronic circuitry as described above.

A storage medium for tangibly embodying computer readable or executable code or electronically executable instructions includes any means that can store, transmit, communicate, or in any way propagate the code or instructions for use by or in connection with the instruction-executing device. For example, the storage medium may include (but is not limited to) any electronic, magnetic, optical, or other storage device, or any transmission medium such as an electrical conductor, an electromagnetic, optical, infrared transmission, etc. The storage medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMS, non-volatile memories (NVMs), optical fibers, etc. Storage media for tangibly embodying code or instructions also include printed media such as computer printouts on paper which may be optically scanned to retrieve the code or instructions, which may in turn be parsed, compiled, assembled, stored and executed by an instruction-executing device. The code or instructions may also be tangibly embodied as an electrical signal in a transmission medium such as the Internet or other types of networks, both wired and wireless.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A method of distributing data by multicast, comprising:
    downloading data by a first computer from a server via a network;
    providing at least one second computer, wherein the second computer does not having the download data;
    monitoring, by the at least one second computer, activities associated with downloading the data over the network;
    detecting, by the at least one second computer, the download of the data by the first computer from the server;
    requesting, by the at least one second computer, the download data from the first computer; and
    multicasting, by the first computer, the requested data to the at least one second computer after the first computer successfully downloaded the data.

2. The method of claim 1, comprising the first computer repeatedly broadcasting an indication that said data is being downloaded.

3. The method of claim 2, wherein the at least one second computer detects the download by reading the broadcasted indication.

4. The method of claim 2, wherein if the first computer stops broadcasting the indication the at least one second computer begins downloading the data from the server.

5. The method of claim 4, wherein the at least one second computer multicasts the data after downloading if any other computers request the data during the download.

6. The method of claim 1, wherein if the multicast is not successfully completed, the at least one second computer begins downloading the data from the server.

7. The method of claim 6, wherein the at least one second computer multicasts the data after downloading if any other computers request the data during the download.

8. The method of claim 1, wherein the data comprises a disk image.

9. The method of claim 1, comprising overwriting a hard drive with the data after the data is received.

10. A computer network comprising a server, a first computer, and a plurality of second computers, the first computer comprising a non-transitory computer readable medium, the non-transitory computer readable medium containing computer readable program code for controlling the first computer by:
    downloading data from the server by the first computer via a network;
    contemporaneously receiving at least one request by the first computer for the download data from at least one second computer, wherein the second computer does not having the download data, and the second computer being configured to monitor activities associated with downloading the data via the network and detecting the download of the data by the first computer from the server; and
    multicasting the data from the first computer to at least one of the plurality of second computers after the first computer successfully downloaded the data.

11. The network of claim 10, wherein at least one of the second computers comprises computer readable program code comprising computer readable program code for controlling the at least one of the second computers by downloading the data if a notification is received that the first computer becomes unresponsive.

12. The network of claim 11, wherein the at least one of the second computers comprises computer readable program code for receiving requests for the data over the network while the data is being downloaded and for responding with a multicast address.

13. The network of claim 12, wherein the at least one of the second computers comprises computer readable program code for repeatedly broadcasting an indication that the data is being downloaded during the downloading.

14. The network of claim 12, wherein the at least one of the second computers comprises computer readable program code for multicasting the data after the downloading is complete if any the requests were received while the data was being downloaded.

15. The network of claim 10, wherein the data comprises a disk image.

16. The network of claim 15, wherein the disk image is identified by at least one element selected from the group consisting of a hash value, disk image size, and parameters of the target hard drive.

17. The network of claim 15, wherein at least one of the second computers comprises computer readable program code for controlling the at least one of the second computers to overwrite a hard drive with the disk image after the disk image is downloaded or received by multicast.

18. The network of claim 10, wherein at least one of the second computers comprises computer readable program code for instructing the at least one of the second computers to broadcast at least one request for the data at least until the multicast beings.

19. An apparatus for duplicating computer disk drives by multicast, comprising:
- means for transferring all or a portion of a disk image from a disk image server to a first computer via a network:
- means for a plurality of second computers to contemporaneously monitor activities associated with transferring all or a portion of the disk image over the network and detect all or a portion of the disk image being transferred to the first computer from the disk image server, wherein the plurality of second computers does not having the transfer all or a portion of the disk image;
- means for contemporaneously requesting transfer of all or a portion of the disk image from the first computer to the plurality of second computers by multicasting the disk image by the first computer; and
- means for the first computer multicasting the disk image data to the at least one of the plurality of second computers after the first computer successfully downloaded the data received the disk image from the disk image server.

\* \* \* \* \*

UNITED STATES PATENT AND TRADEMARK OFFICE
CERTIFICATE OF CORRECTION

PATENT NO. : 8,281,025 B2
APPLICATION NO. : 11/151079
DATED : October 2, 2012
INVENTOR(S) : Lee Preimesberger Page 1 of 1

It is certified that error appears in the above-identified patent and that said Letters Patent is hereby corrected as shown below:

In column 10, lines 7-8, in Claim 1, delete "the download" and insert -- download the --, therefor.

In column 12, line 4, in Claim 19, delete "network:" and insert -- network; --, therefor.

In column 12, line 11, in Claim 19, after "transfer" insert -- of --.

Signed and Sealed this
Ninth Day of April, 2013

Teresa Stanek Rea
*Acting Director of the United States Patent and Trademark Office*